United States Patent [19]

Kim et al.

[11] Patent Number: 5,715,229
[45] Date of Patent: Feb. 3, 1998

[54] DISK RECORDING/REPRODUCING APPARATUS HAVING TWO TRAYS SO THAT A DISK IN A MAGAZINE CAN BE REPLACED BY ONE TRAY WHEN A DISK IN THE OTHER TRAY IS BEING RECORDED/REPRODUCED

[75] Inventors: Young-Taek Kim, Suwon; Cheol-Woong Ahn, Seoul, both of Rep. of Korea

[73] Assignee: Samsung Electronics Co., Ltd., Kyungki-Do, Rep. of Korea

[21] Appl. No.: 686,714

[22] Filed: Jul. 26, 1996

[30] Foreign Application Priority Data

Oct. 31, 1995 [KR] Rep. of Korea .................. 95-39055

[51] Int. Cl.⁶ .................................................. G11B 17/22
[52] U.S. Cl. ........................ 369/178; 369/75.2; 369/192
[58] Field of Search ........................ 369/178, 191, 369/192, 75.2, 36; 360/98.04

[56] References Cited

U.S. PATENT DOCUMENTS

| | | | |
|---|---|---|---|
| 4,949,328 | 8/1990 | Kase et al. | 369/75.2 |
| 5,146,446 | 9/1992 | Ota et al. | 369/75.2 X |
| 5,226,032 | 7/1993 | Ikedo et al. | 369/178 |
| 5,327,412 | 7/1994 | Lee | 369/75.2 |
| 5,384,760 | 1/1995 | Kumakura | 369/178 X |
| 5,615,197 | 3/1997 | Choi | 369/75.2 X |

*Primary Examiner*—Stuart S. Levy
*Assistant Examiner*—William R. Korzuch
*Attorney, Agent, or Firm*—Sughrue, Mion, Zinn, Macpeack & Seas, PLLC

[57] ABSTRACT

A disk recording/reproducing apparatus includes a stacked pair of trays having a disk seating unit thereon. While a disk of one tray is recorded or reproduced, another disk mounted within a magazine can be replaced by the other tray.

4 Claims, 17 Drawing Sheets

DISK RECORDING/REPRODUCING APPARATUS HAVING TWO TRAYS SO THAT A DISK IN A MAGAZINE CAN BE REPLACED BY ONE TRAY WHEN A DISK IN THE OTHER TRAY IS BEING RECORDED/REPRODUCED

BACKGROUND OF THE INVENTION

The present invention relates to a disk recording/reproducing apparatus and, more particularly, to a disk recording/reproducing apparatus having a disk changer for accommodating a plurality of disks, which is capable of changing disks while a disk is being reproduced.

A disk recording/reproducing apparatus capable of recording/reproducing from a multitude of disks has some form of disk changer. In general, the disk changer can be classified as one of a roulette type, a fixed magazine type, and an elevator type. The roulette-type disk changer selects a disk from a rotating tray of circularly arranged disks on a turntable similar to a roulette wheel. The fixed magazine type disk changer selects a disk by extracting from a stack of disks stored in slots of a magazine cassette. The elevator-type disk changer stores disks in the same manner as the fixed magazine type but selects a disk by moving the magazine cassette up and down to then position the selected disk for reading or recording by an optical pickup.

In a disk recording/reproducing apparatus having a disk changer, a plurality of disks can be selected and reproduced rapidly for hours of uninterrupted play with the benefit of not having to manually change disks. However, when a user wishes to play an external disk which is not included in the disk changer, the play operation must be halted and the user must replace a disk in the disk changer with the external disk causing a break in the continuous reproduction of disks.

FIG. 1 is a cross-sectional view of a conventional elevator-type disk recording/reproducing apparatus. In this apparatus, there is provided a disk reproducing unit 30 behind openings 33, near the front of the apparatus, and a disk storage magazine 20 accommodating a plurality of subtrays 23a through 23f in the rear of the apparatus. The plurality of the subtrays 23a through 23f each can accommodate one disk. However, one subtray 23a among the plurality of the subtrays 23a through 23f is left unoccupied.

A clamp arm 64, to which a clamp 71 for clamping a disk is supported, is elevatably installed in the upper portion of the disk reproducing unit 30. A main tray 31 for housing the subtrays 23a through 23f is slidably installed between the clamp 71 and the disk reproducing unit 30. The plurality of subtrays 23a through 23f are movable from the disk storage magazine 20 to the main tray 31 by means of rollers 91 and 92.

The elevator-type disk recording/reproducing apparatus operates as follows. When reproducing a disk that is not stored in the disk storage magazine 20, the empty subtray 23a is moved to the main tray 31 by means of the driving rollers 91 and 92 and is projected outside the body of the apparatus via the openings 33 together with the main tray 31, allowing a desired disk for reproduction to be housed in the subtray 23a. Thereafter, the main tray 31 and subtray 23a are transferred to the disk reproducing unit position, then, the subtray 23a is lowered by a predetermined operating means to seat the disk on a turntable. Subsequently, the clamp arm 64 descends to secure the disk to the clamp 71.

In the disk recording/reproducing apparatus, since at least one subtray is left unoccupied, an external disk can be accommodated in the empty subtray. However, in such a conventional disk recording/reproducing apparatus, the reproduction/recording of a disk must be stopped for replacement of a disk among those in the subtrays, since the external disk cannot be exchanged with a disk accommodated in the subtray during a disk reproduction.

SUMMARY OF THE INVENTION

To solve the problems of the prior art, it is an object of the present invention to provide a disk recording/reproducing apparatus having a magazine accommodating a plurality of disks and which can exchange a disk accommodated in the magazine with an external disk during disk reproducing.

To accomplish the above object, there is provided a disk recording/reproducing apparatus comprising: a housing including a front wall having at least one disk entrance therein, the disk entrance being positioned at a preset height; a magazine having a plurality of disk receiving shelves and elevatably installed at a rear of the housing; means for elevating the magazine; a deck installed on said housing between the disk entrance and the magazine; a subtray elevatably installed in said housing above the deck; means for elevating the subtray; a first tray having a first disk seating unit thereon and slidably supported by said subtray so as to be movable back and forth with respect to the housing, the first tray being positioned at the same height as the disk entrance in a lowered state of the subtray; a second tray having a second disk seating unit thereon and slidably supported by said subtray below the first tray to be movable back and forth with respect to the housing, the second tray being positioned at the same height as the disk entrance in a raised state of the subtray; means for transferring a disk mounted within the magazine to the disk seating unit of one of the first and second trays positioned at the same height as the disk entrance to seat the disk on the disk seating unit of the first or second tray or to accommodate the disk seated thereon into the magazine; a turntable installed on the deck and operative to protrude beyond the second disk seating unit, so as to pick up a selected disk placed on the second disk seating unit and place the selected disk thereon during lowering of the subtray; an optical pickup installed on the deck; and a tray transferring means for horizontally moving one of the first and second trays positioned at the same height as the disk entrance back and forth with respect to the housing to insert and extract the tray through the disk entrance.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 1:
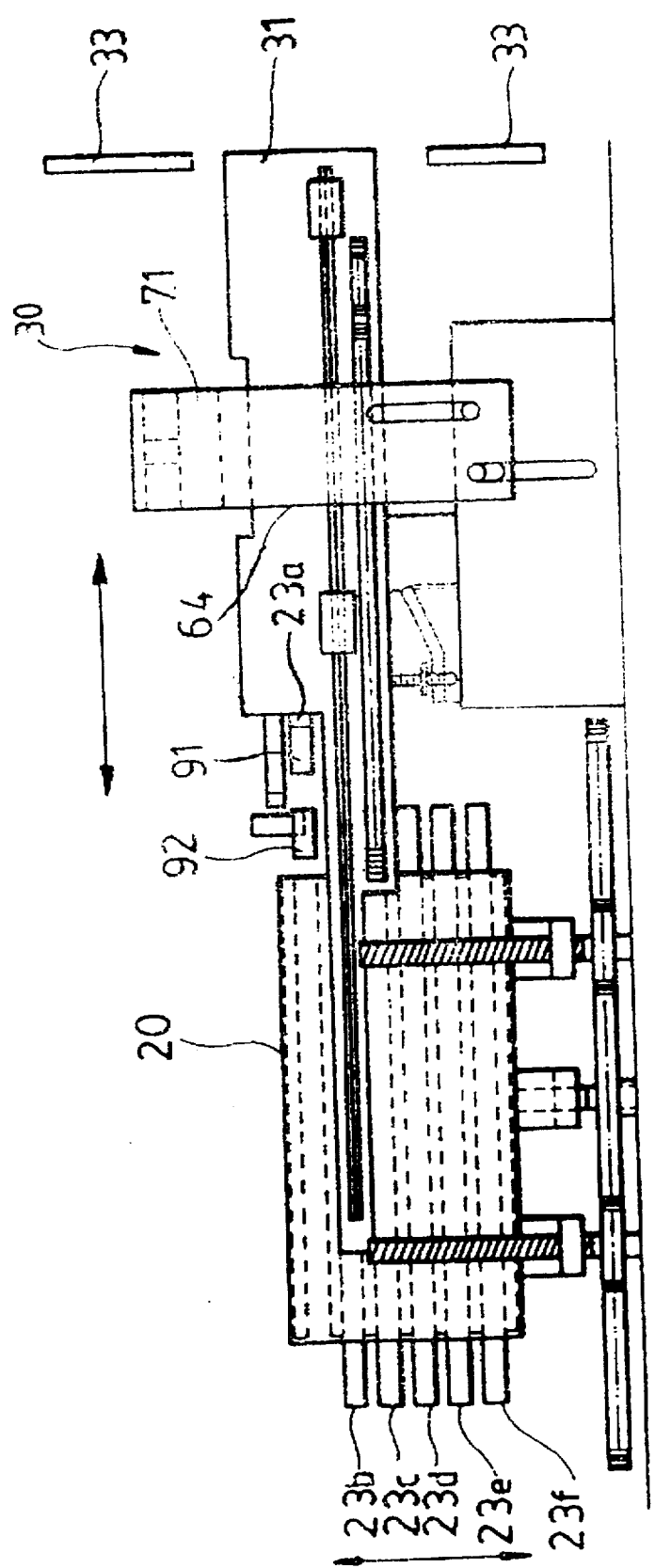
FIG. 1 is a schematic diagram of a conventional elevator magazine-type disk recording/reproducing apparatus.

Referring to FIGS. 2 through 7, a disk entrance 111 is formed through a front wall of a housing 110 so that a disk can be inserted into and ejected from the inside of the housing 110, in a disk recording/reproducing apparatus 100 according to the present invention. A magazine 120 having multiple layers of disk receiving shelves 121 disposed for receiving a plurality of disks is provided inside the housing 110 at the rear thereof. The magazine 120 is screw-coupled to a screw stock or shaft 122 rotatably connected to the housing 110. The magazine 120 is connected to a guide stock or rod 122a and elevates along the guide stock 122a as the screw stock 122 is rotated.

A subtray 130 and a deck 140 are installed between the disk entrance 111 and the magazine 120. The subtray 130 is elevatably installed along guide stocks or rods 131, and the deck 140 is fixed at the bottom of the housing 110.

Figure 5:
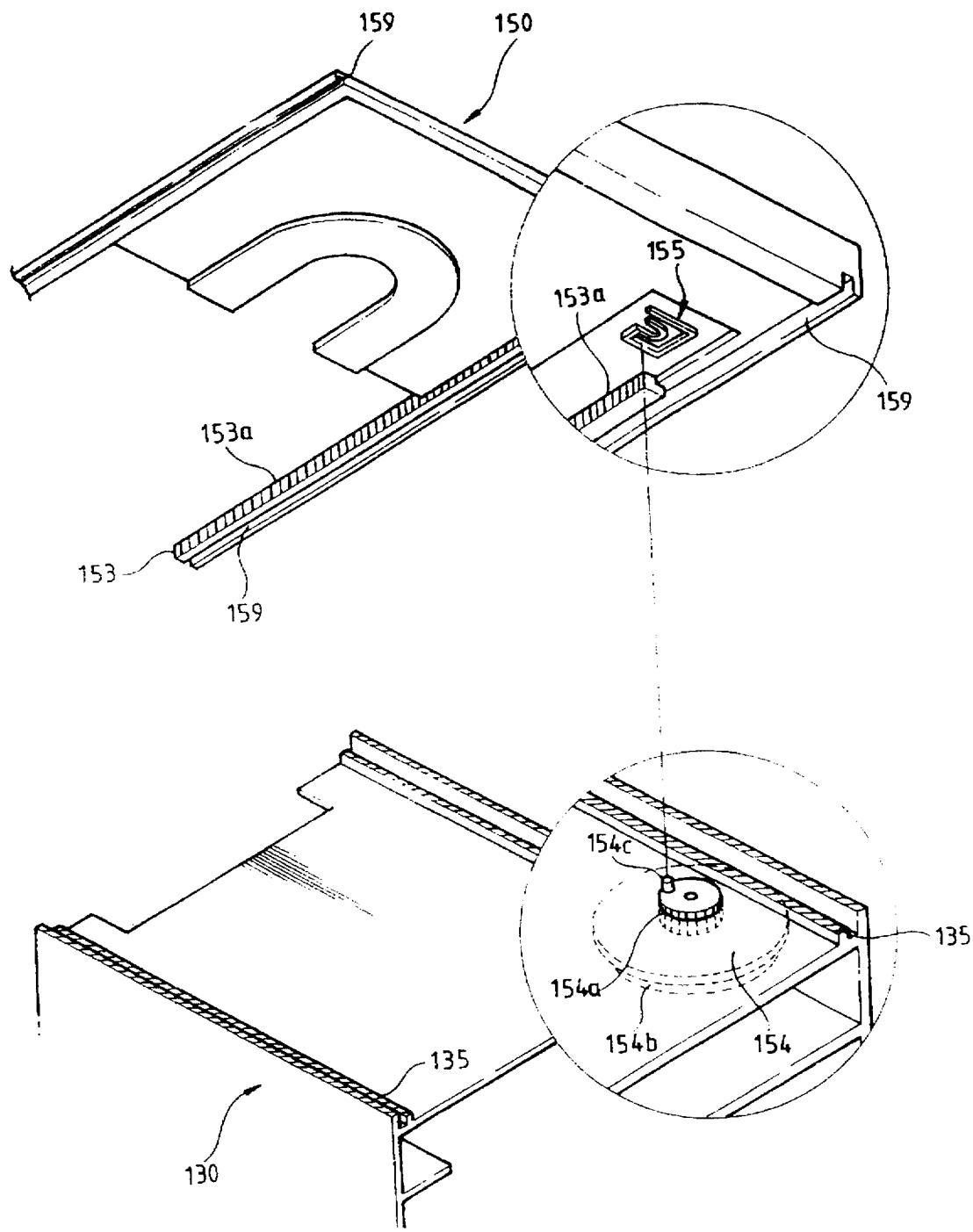
FIG. 5 is an exploded perspective view of the first tray and the subtray shown in FIG. 2.
Figure 6:
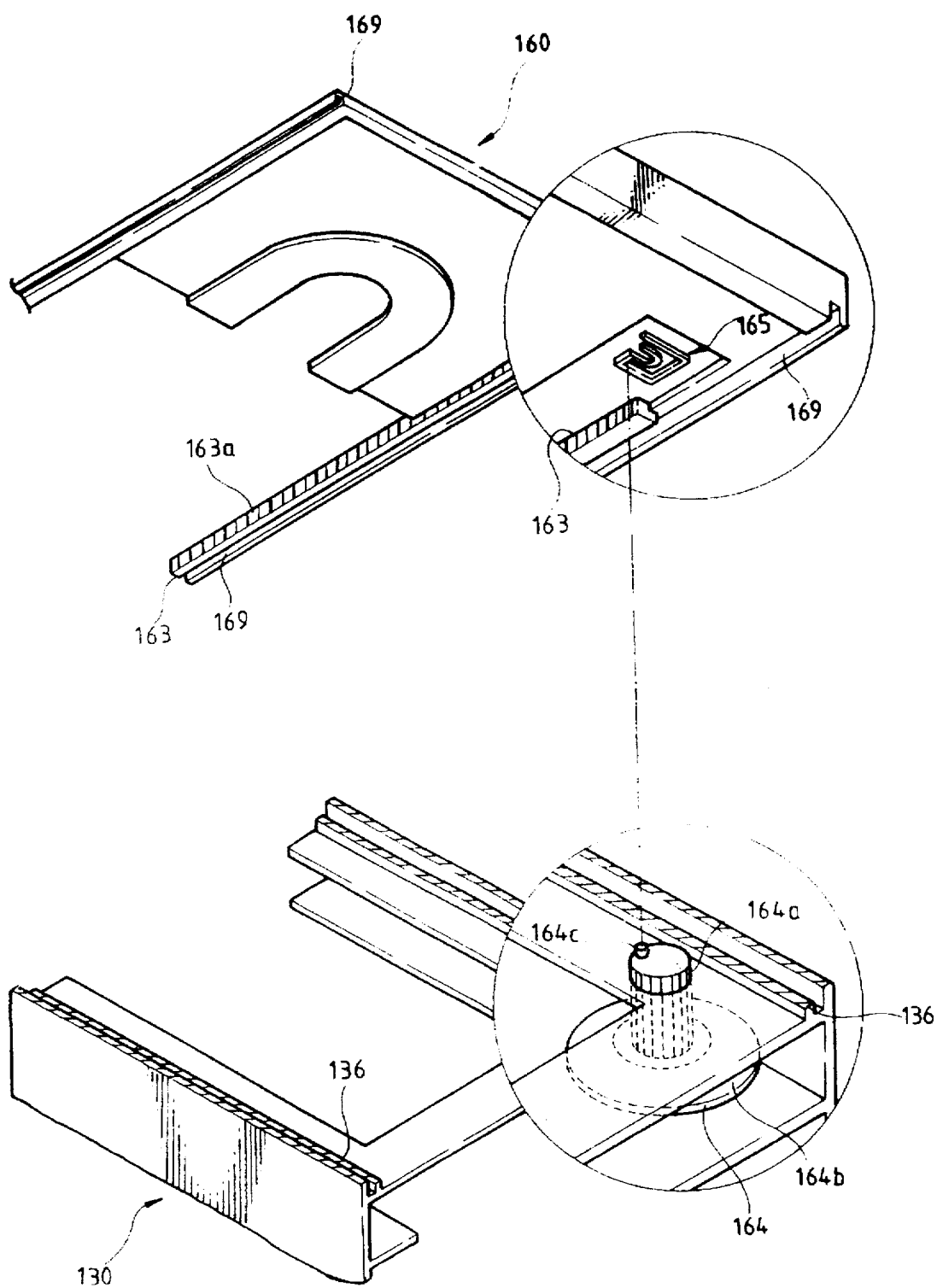
FIG. 6 is an exploded perspective view of the second tray and the subtray shown in FIG. 2.
Figure 12:
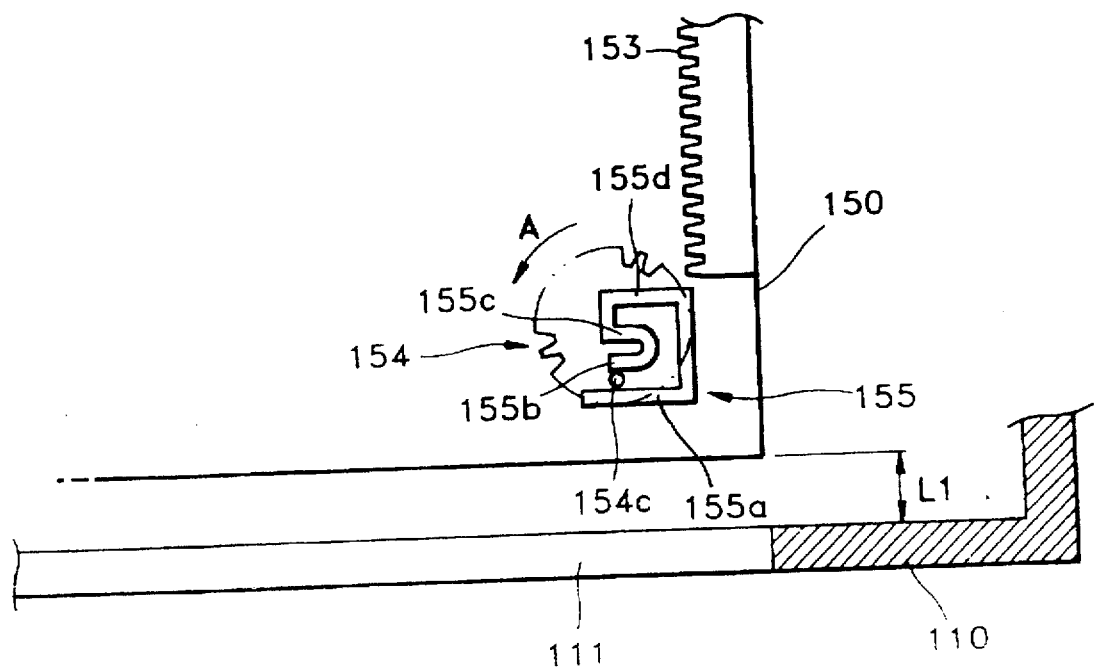
FIGS. 12 through 14 are structural plan views of important portions, sequentially showing the positional relationship between a locking rib of the first tray and a connecting protrusion of a first rotator when the first tray is transferred from a first position to a second position.

A first tray 150 is supported in the upper portion of the subtray 130 and a second tray 160 is supported in the lower portion of the subtray 130 between the first tray 150 and the deck 140. The first tray 150 and second tray 160 are vertically spaced from each other by the elevating distance of the subtray 130. The second tray 160 is positioned at the same height as that of the disk entrance 111 when the subtray 130 is in a raised state, and the first tray 150 is positioned at the height of the disk entrance 111 when the subtray 130 is in a lowered state. A disk seating unit 151 in which a disk D1 is seated is formed on top of the first tray 150, and a parallel pair of guiding units 152 and 153 which extend to the back of the housing are installed at both sides of the first tray 150. As shown in FIG. 5, there are guide grooves 159 formed at the bottoms of the respective guiding units 152 and 153. The guide groove 159 are slidably connected to a pair of guide rails 135 formed at the sides of the subtray 130 beneath the first tray 150. Thus, the first tray 150 can move forward and backward with respect to the housing 110 on the subtray 130. A rack 153a is formed at the inner side of the guiding unit 153 from the leading edge of the guiding unit 153 to a locking rib 155 at the other end thereof. As shown in FIG. 12, the locking rib 155 protruding from the bottom of the first tray 150 has a first wall 155a, a second wall 155b, a third wall 155c and a fourth wall 155d, spaced apart from the front edge of the first tray 150. The locking rib 155 is provided as means for transferring the first tray 150 to the front and rear of the housing, in connection with the rack 153a, a tray driving motor 180 (to be described later) and a first rotator 154 (to be described later).

The second tray 160 has the same configuration as that of the first tray 150. In other words, there is a disk seating unit 161 formed on the upper portion of the second tray 160 onto which a disk D2 can be placed. The second tray 160 is movable horizontally forward and backward with respect to the housing 110, by connecting guide grooves 169 formed at the bottoms of the respective guiding units 162 and 163. The guide grooves 169 are slidably connected to a pair of guide rails 136 formed at the sides of the subtray 130 beneath the second tray 160. Also, the second tray 160 has a rack 163a and a locking rib 165 (see FIG. 6), each having the same configuration as the corresponding elements of the first tray 150. The locking rib 165 is provided as means for transferring the second tray 160 to the front and rear of the housing 110, in connection with the rack 163a, the tray driving motor 180 and a second rotator 164 (to be described later).

Figure 3:
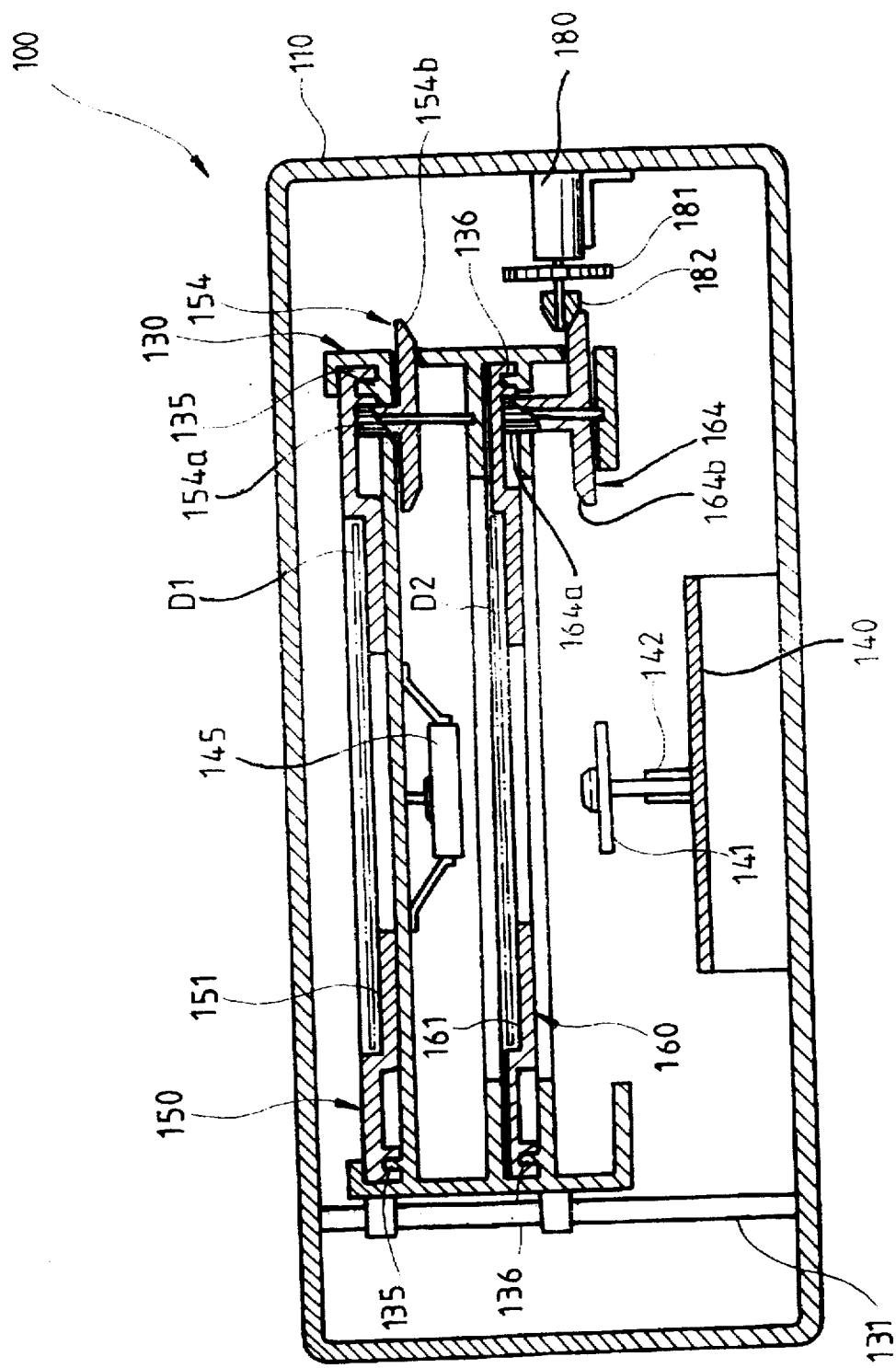
FIG. 3 is a sectional view taken along the line III—III of FIG. 2.

Referring to FIGS. 3 and 5, there is the first rotator 154 rotatably installed at one end of the subtray 130. A gear 154a, which is operative to engage the rack 153a of the first tray 150, is formed on the first rotator 154 and a coupling protrusion 154c protrudes up from a peripheral portion of the gear 154a. The rotation diameter of the coupling protrusion 154c depending on the rotation of the first rotator 154 is set to be larger than the interval between the first wall 155a and the fourth wall 155d of the locking rib 155 formed underneath the first tray 150. A conical friction unit 154b is formed on the lower surface of the first rotator 154.

The second rotator 164 having a gear 164a, a coupling protrusion 164c and a conical friction unit 164b, similar to the first rotator 154, is rotatably installed in the lower portion of the subtray 130. The gear 164a of the second rotator 164 is operative to engage with the rack 163a of the second tray 160 just as in the case of the first tray 150.

The friction unit 154b of the first rotator 154 and the friction unit 164b of the second rotator 164 are installed so that they face each other. The respective friction units 154b and 164b protrude slightly outside the subtray 130 via openings in a sidewall thereof.

Figure 7:
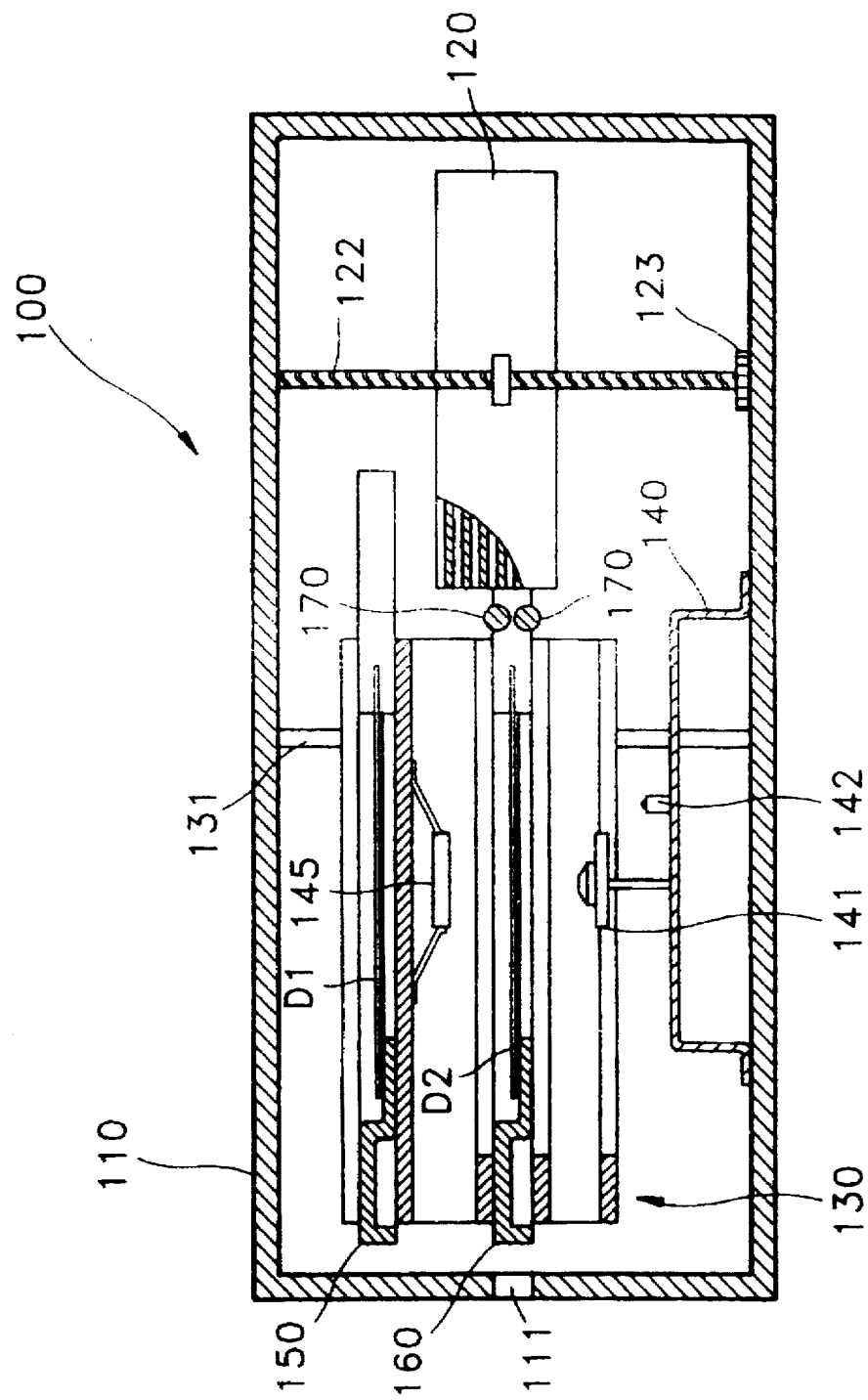
FIG. 7 is a sectional view taken along the line VII—VII of FIG. 2.

Disk recording/reproducing elements such as a turntable 141 for disk rotation and an optical pickup 142 for light beam emission are installed in the deck 140. When the subtray 130 is lowered, the disk D2 seated in the disk seating unit 160 of the second tray 160 is transferred to and supported by the turntable 141 which protrudes up slightly with respect to the disk seating unit 161. Referring to FIG. 7, a clamp 145 is installed between the first tray 150 and second tray 160 of the subtray 130. When the subtray 130 is lowered, the clamp 145 applies pressure to the top of the disk D2 supported by the turntable 141 to prevent wobbling of the disk D2.

Figure 4:
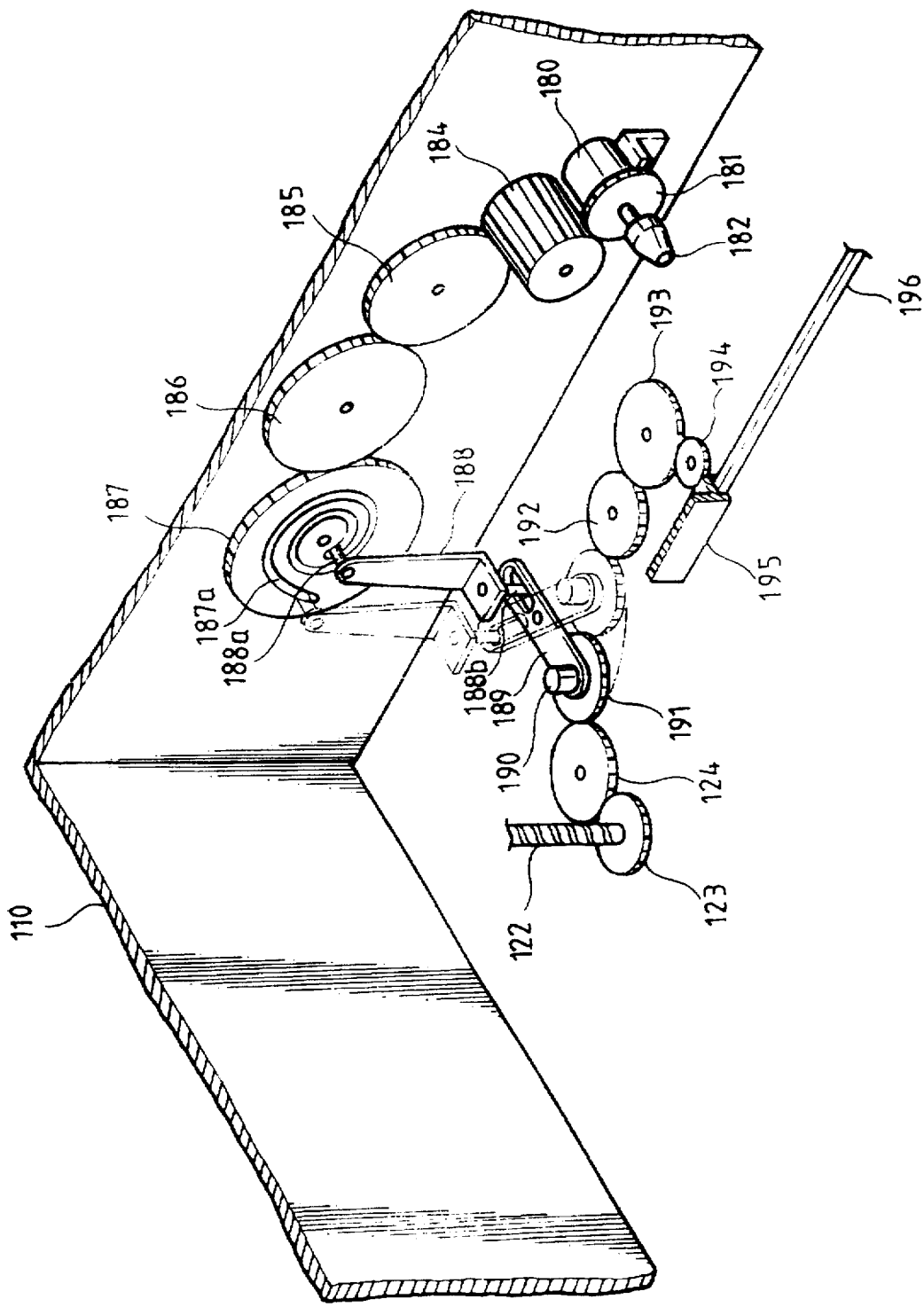
FIG. 4 is a schematic perspective view showing the inside of the housing shown in FIG. 2.

Referring to FIG. 4, a tray driving motor 180 is fixed on the inside of a sidewall of the housing 110. A conical friction member 182 is fixed on the output shaft of the tray driving motor 180. The friction member 182, made of a material having a large friction coefficient such as rubber, makes close contact to the friction unit 154b of the first rotator 154 when the subtray 130 is in a lowered state and closely contacts the friction unit 164b of the second rotator 164 when the subtray 130 is in a raised state. The friction member 182 is provided as a tray transferring means, together with the first rotator 154 and the second rotator 164, for inserting and ejecting either the first tray 150 or the second tray 160, whichever is positioned at the height of the disk entrance 111, into or from the disk entrance 111.

Referring to FIG. 4, a driving gear 181 is coupled on the output shaft of the tray driving motor 180, together with the friction member 182. The driving gear 181 is geared to a rotation cam plate 187 with a train of gears 184, 185 and 186 interposed therebetween. A snail cam groove 187a which loosens from the center of the rotation cam plate 187 to the periphery thereof is formed in the rotation cam plate 187. An upper protrusion 188a of a slide member 188 is installed to be movable forward and backward with respect to housing 110 and is locked in the snail cam groove 187a. A lower protrusion 188b of the slide member 188 is connected to one end of the rotating member 189 rotatably coupled at the bottom of the housing 110. A coupling gear 191 is rotatably connected to the other end of the rotating member 189. The elevating motor 190 connected to the rotating member 189 drives the coupling gear 191. The coupling gear 191 is meshed with a first connecting gear 124 or a second connecting gear 192 depending on the direction of rotation of the rotating member 189.

The first connecting gear 124 is coupled to a gear 123 fixed at the bottom of the screw stock 122. The first connecting gear 124 selectively connected to the coupling gear 191 by the tray driving motor 180, and the screw stock 122 connected to the first connecting gear 124 by the gear 123, are provided as the magazine elevating means for elevating the magazine 120 together with the elevating motor 190.

The second connecting gear 192 is connected to a gear 195a (see FIG. 8) of a rack member 195 with a train of gears 193 and 194 interposed therebetween. The rack member 195 is slidably connected forward and backward with respect to the housing 110 along a rail 196 installed at the bottom of the housing 110. On one side of the rack member 195 there is a protrusion 195b. The protrusion 195b is slidably inserted into a diagonal cam groove 132 formed in the sidewall of the subtray 130. This allows the subtray 130 to move up and down as the rack member 195 moves forward and backward. The rack member 195 having the aforementioned configuration is provided as a subtray elevating means together with the coupling gear 191 selectively connected to the second connecting gear 192 by the tray driving motor 180 and the elevating motor 190 for rotating the coupling gear 191 in opposite directions.

A pair of rollers 170 are installed between the subtray 130 and the magazine 120, and the shafts of the respective rollers are spaced apart by a predetermined distance in parallel. The rollers 170 are provided as a disk transferring means for transferring a disk from the magazine 120 to the disk seating unit of either the first tray 150 or the second tray 160, whichever is positioned at the height of the disk entrance 111 of the housing 110, or to place a disk seated on the disk seating unit of the tray into the magazine 120. If the rollers 170 rotate after the disk is inserted therebetween, the disk is pressingly transferred from the subtray 130 to the magazine 120 by the frictional force of the rollers 170, or from the magazine 120 to the subtray 130, depending on the rotational direction of the rollers 170.

In the raised state of subtray 130, the first and second trays 150 and 160 are supported at a first position where the disks D1 and D2 in disk seating units 151 and 161 are spaced apart from the rollers 170 by a predetermined distance. During the lowering of the subtray 130, the disk D2 seated in the disk seating unit 161 of the second tray 160 is placed on and supported by the turntable 141 of the deck 140.

With the subtray 130 in a lowered state, the first tray 150 may be moved horizontally between the first position and a second position where the disk D1 seated in the disk seating unit 151 is inserted between the rollers 170 of the housing 110, by a first tray position changing means having the locking rib 155, the first rotator 154 with the coupling protrusion 154c connected to the locking rib 155 and the tray driving motor 180. The first tray 150 may be locked at the first position or the second position.

With the subtray 130 in a raised position, the second tray 160 may also be moved horizontally from the first position to a second position where the disk D2 seated in the disk seating unit 161 is inserted between the rollers 170 of the housing 110 forward and backward with respect to the housing 110, or its position can be fixed at the first or second position. For a second tray position changing means for horizontally moving second tray 160 between the first position and the second position, there is the locking rib 165, the second rotator 164 with the coupling protrusion 164c connected to the locking rib 165 and the tray driving motor 180. The second tray 160 may be locked at the first or second position.

The operation of the disk recording/reproducing apparatus having the aforementioned configuration will now be described.

Figure 8:
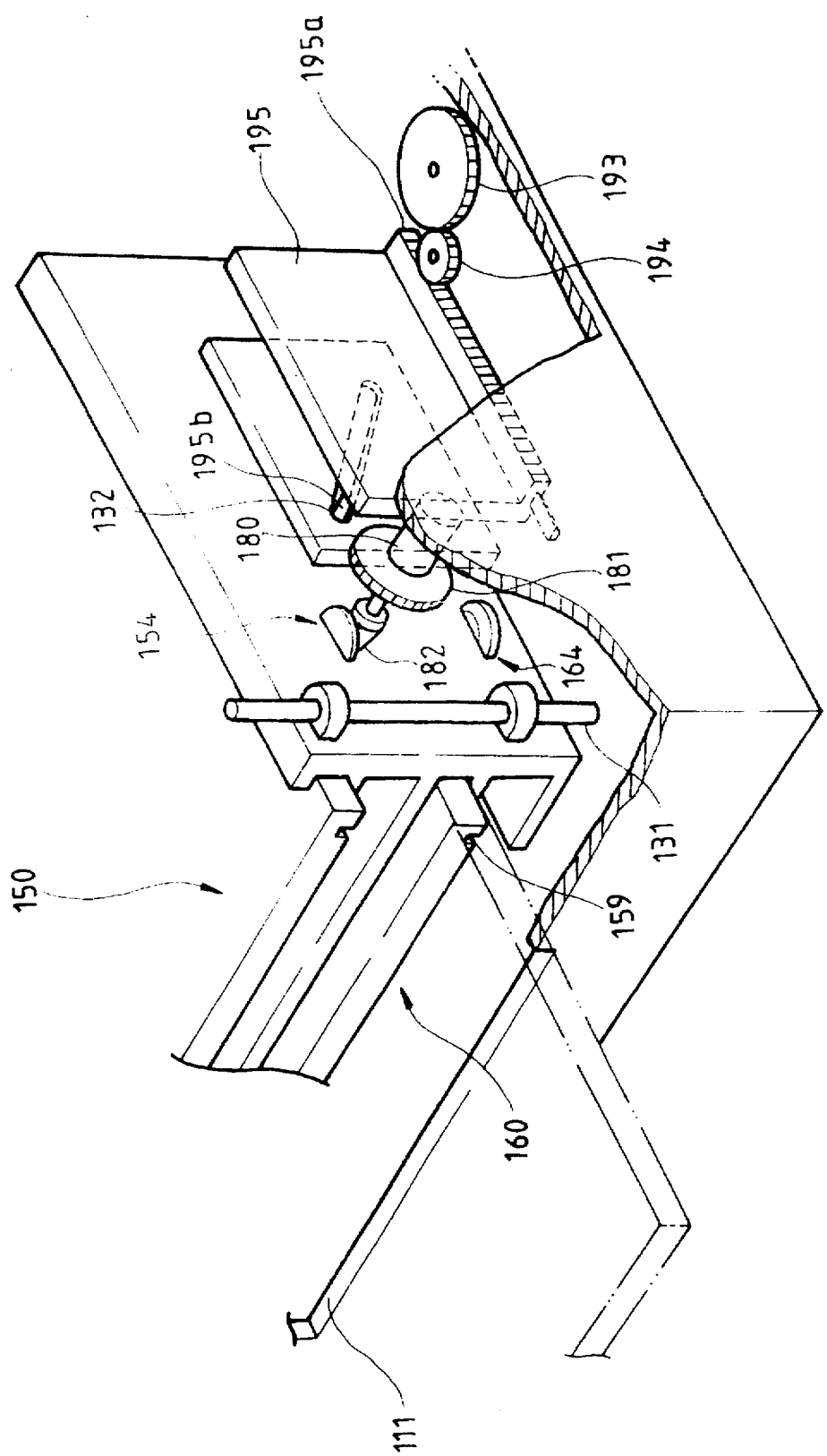
FIG. 8 is a sectional view showing important portions with the subtray in a lowered state.

First, as shown in FIGS. 3 and 7, if the disk D2 seated in the disk seating unit 161 of the second tray 160 is to be recorded or reproduced in the raised state of the subtray 130, the subtray 130 must be lowered. For this purpose, if the tray driving motor 180 is rotated in one direction, the driving gear 181 fixed on the output shaft of the tray driving motor 180 rotates, and the rotation cam plate 187 rotates by the train of gears 184, 185 and 186 connected to the driving gear 181. The slide member 188 whose upper protrusion 188a is locked into the snail cam groove 187a of the rotation cam plate 187 is transferred from the state depicted by the solid line to that depicted by the dashed line in FIG. 4 by the rotation of the rotating cam plate 187. At this time, the rotating member 189 connected to the slide member 188 also rotates in the manner as depicted by the dashed line in FIG. 4, and the coupling gear 191 rotatably connected to the end of the rotating member 189 is meshed with the second connecting gear 192. In such a state, if the elevating motor 190 rotates in one direction to rotate the coupling gear 191, the rotational force is transferred to the rack member 195 via the train of gears 192, 193 and 194, so that the rack member 195 is transferred from the state shown in FIG. 2 to the front of the housing 110 along the rail 196. According to the movement of the rack member 195, the protrusion 195b of the rack member 195 slides along inside the diagonal cam groove 132 to lower the subtray 130 as shown in FIGS. 8 through 10.

Figure 9:
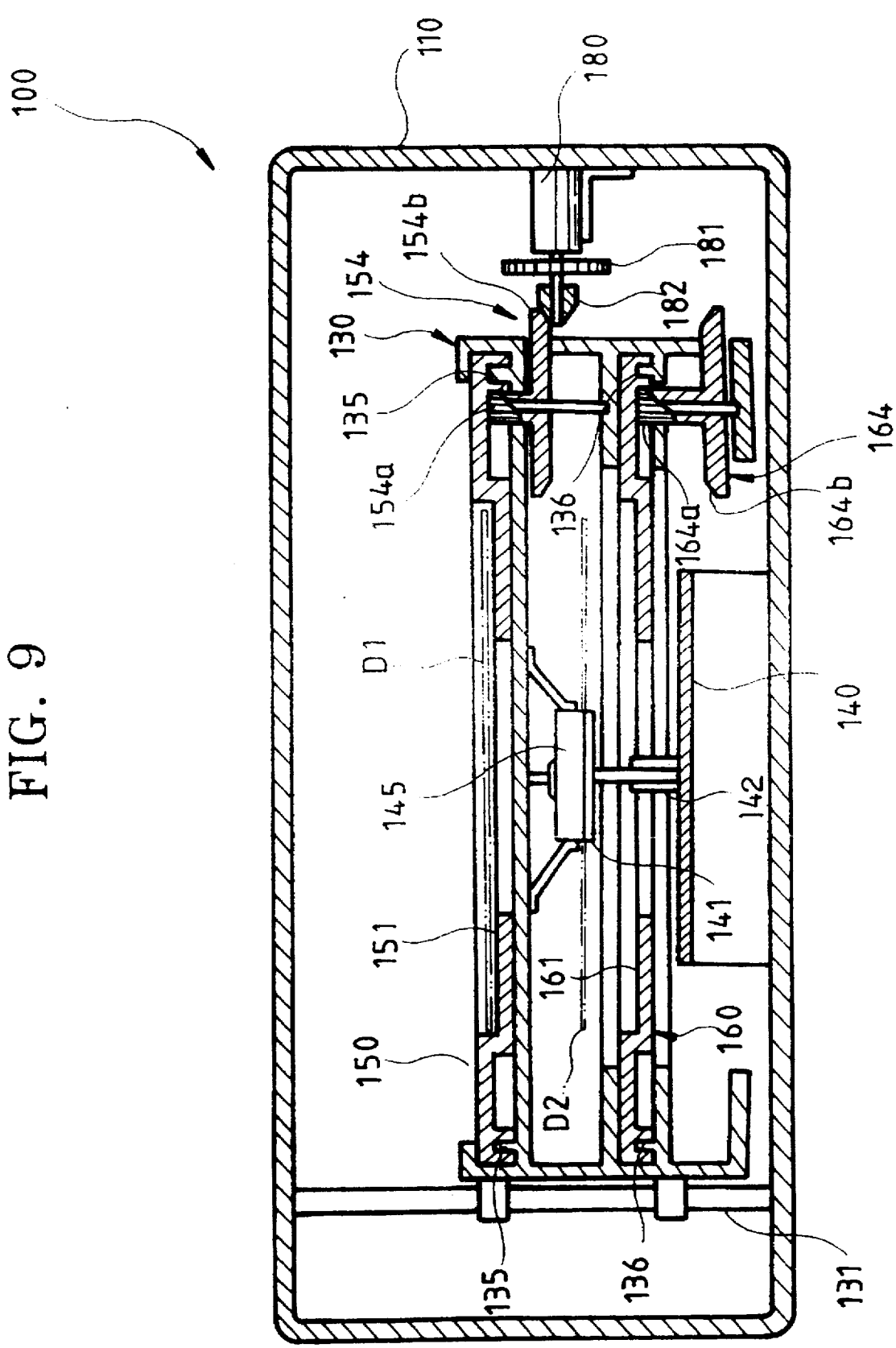
FIG. 9 is a schematic sectional view, as in FIG. 3, with the subtray in its lowered state.
Figure 10:
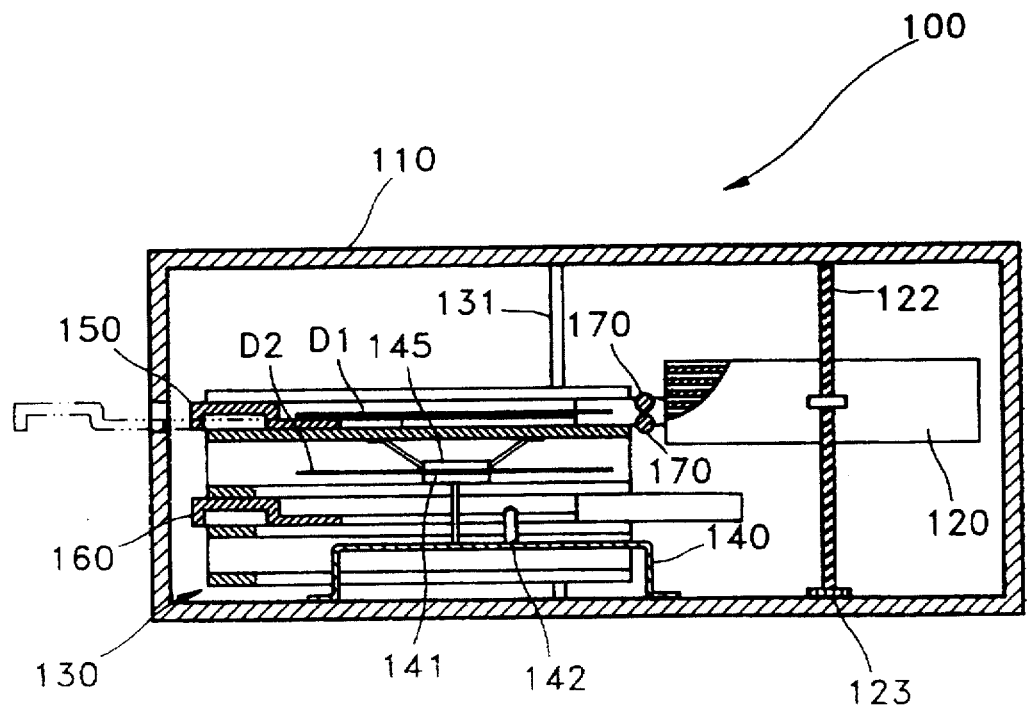
FIG. 10 is a schematic sectional view, as in FIG. 7, with the subtray in its lowered state.

With the subtray 130 lowered to the position shown in FIGS. 9 and 10, the first tray 150 is positioned at the height of the disk entrance 111 of the housing 110 and friction member 182 connected to the output shaft of the tray driving motor 180 makes contact with the friction unit 154b of the first rotator 154. At this time, the gear 154a of the first rotator 154 disengages with the rack 153a of the first tray 150, as shown in FIG. 12. The coupling protrusion 154c of the first rotator 154 is positioned between the first wall 155a and the second wall 155b of the locking rib 155. The disk D2 seated in the disk seating unit 161 of the second tray 160 is then transferred to and supported by the turntable 141 of the deck 140. Lastly, the turntable 141 rotates and the optical pickup 142 moves radially along the disk D2 to then record information onto or read information from the disk D2.

Figure 11:
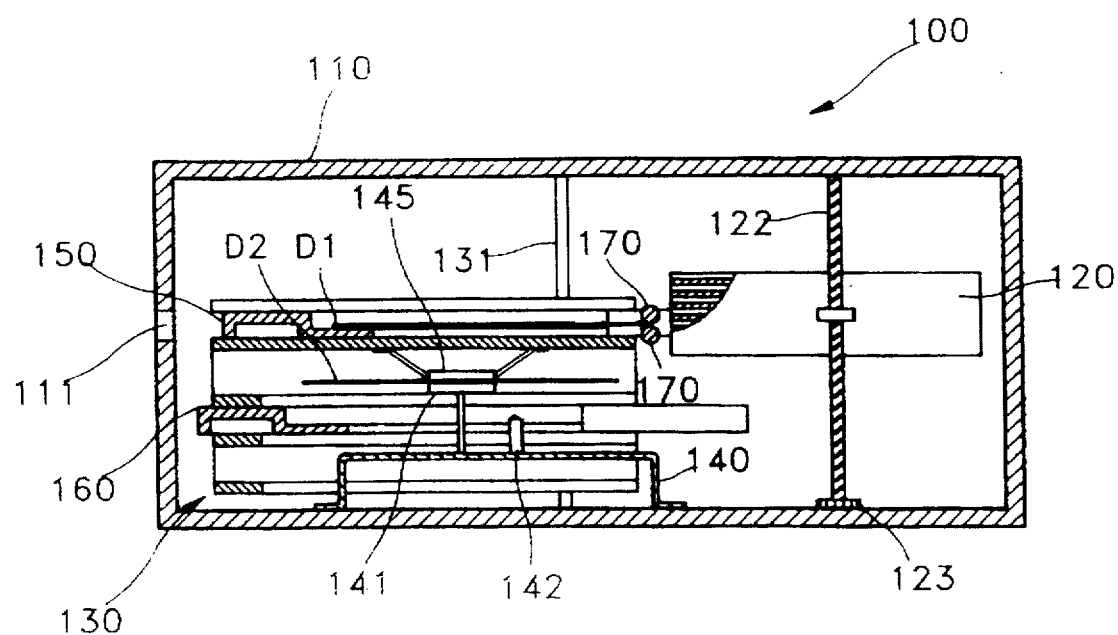
FIG. 11 is a schematic sectional view showing the first tray moved to a second position.

In this manner, during recording or reproducing of the disk D2, the first tray 150 can be moved between a position where it protrudes outside the housing 110 via the disk entrance 111 as indicated by the dashed line of FIG. 10 and the position shown in FIG. 11. The movement between positions can be described as follows. First, as shown in FIG. 12, in the state where the first tray 150 is located inside the housing 10 apart from the disk entrance 111 by a constant distance L1, if the tray driving motor 180 is operated so that the first rotator 154 rotates in the direction indicated by arrow A, the friction member 182 fixed on the output end of the tray driving motor 180 also rotates. At this time, the first rotator 154 closely contacting the rotating the friction member 182 rotates by the friction force between the friction unit 154b and the friction member 182.

Figure 13:
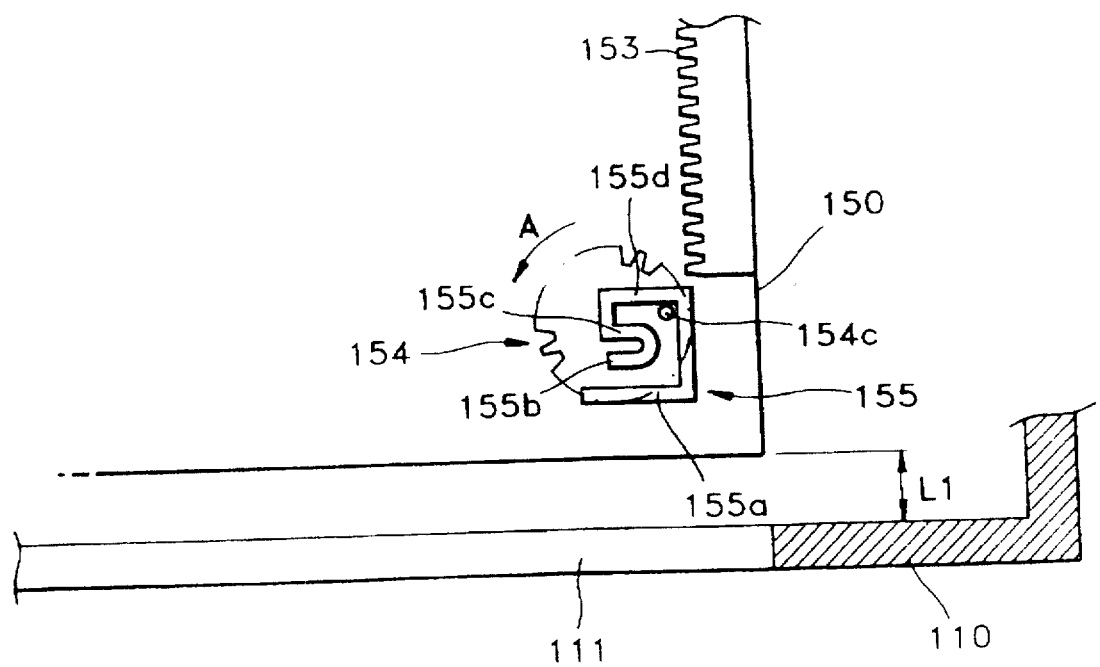
Figure 14:
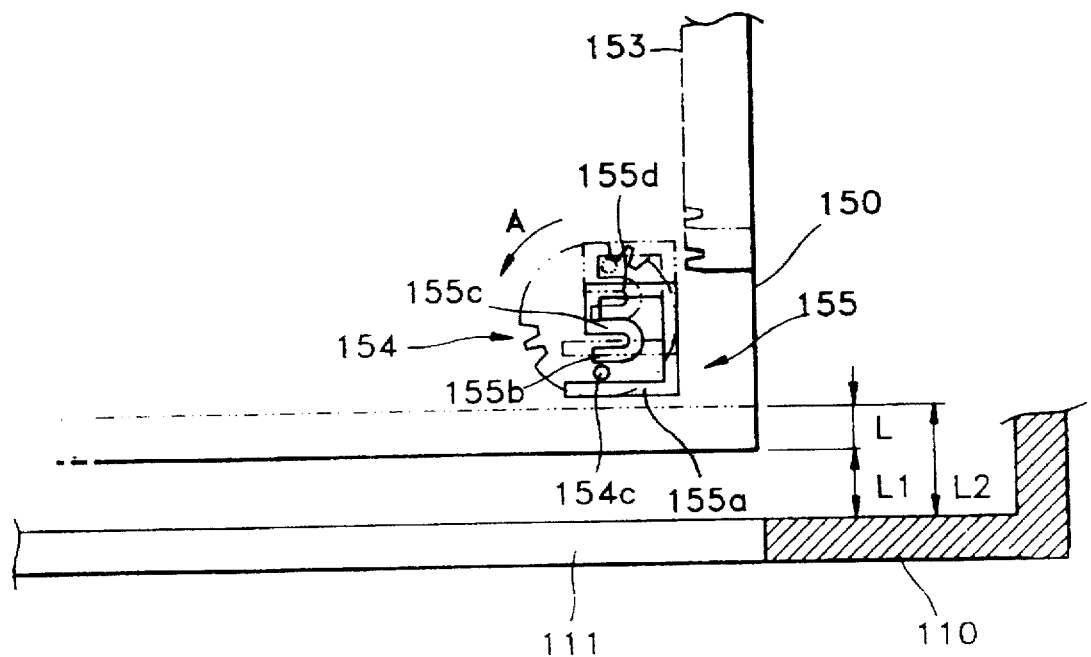

According to the rotation of the first rotator 154, the coupling protrusion 154c of the first rotator 154 which is inserted between the first wall 155a and second wall 155b in the lower portion of the first tray 150, contacts fourth wall 155d while it rotates in the direction of arrow A, as shown in FIG. 13. Then, according to the continued rotation of the tray driving motor 180, the coupling protrusion 154c presses against the fourth wall 155d to then move the first tray 150 away from the disk entrance 111 of the housing 110 by a predetermined distance L, as indicated by the dashed line of FIG. 14. Accordingly, the first tray 150 is spaced apart from the disk entrance 111 by a predetermined distance L2. At this time, the position of the first tray 150 is positioned at the second position where the disk D1 seated in the disk seating unit 151 is inserted between the rollers 170, as shown in FIG. 11.

In the state where the first tray 150 is positioned at the second position, the coupling protrusion 154c of the first rotator 150 is inserted between the third wall 155c and fourth wall 155d. Then, first tray 150 is fixed at the second position, with the back and forth movement of the housing 110 being prevented.

With the first tray 150 fixed at the second position as described above, the disk D1 seated on the disk seating unit 151 of the first tray 150 is inserted between the rollers 170. As the rollers 170 rotate, the disk D1 is pressingly transferred toward the magazine 120 by the friction force of the rollers 170 and is received in a disk receiving shelf positioned at the same height as that of the transferred disk among the disk receiving shelves 121 of the magazine 120.

After the magazine 120 is raised or lowered in height by an elevation process (to be described later), a disk of another disk receiving shelf is extracted by a well-known disk extracting means such as an extracting lever (not shown) installed within the disk receiving shelf, inserted between rollers 170 and then pressingly transferred toward the first tray 150. The disk extracted from the magazine 120 and pressingly transferred by the rollers 170 is seated in the disk seating unit 151. In this way, if the upper disk D1 of the first tray 150 is inserted between the rollers 170 by the movement of the first tray 150 to the second position, the need to install a separate extracting lever for inserting a disk on the tray between the rollers 170 is eliminated. This reduces costs in comparison to the conventional disk recording/reproducing apparatus which does not have a method of moving the tray to the above-described second position.

Figure 15:
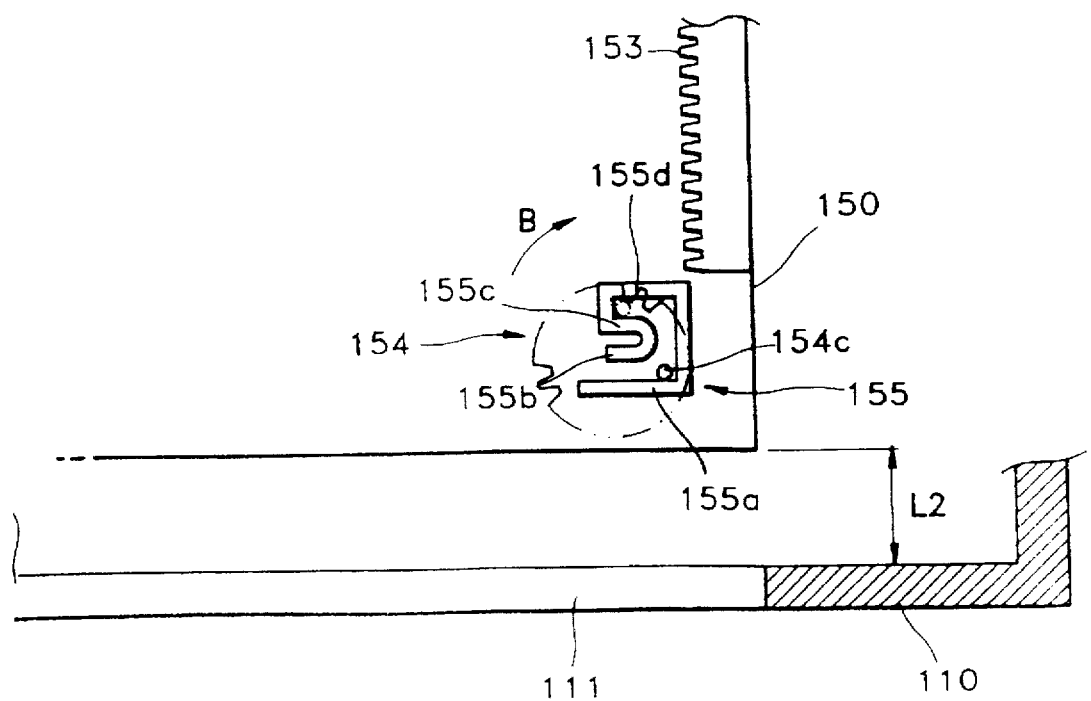
FIGS. 15 and 16 are structural plan views of important portions, sequentially showing the positional relationship between a locking rib of the first tray and a connecting protrusion of the first rotator when the first tray is transferred from the second position to the first position.
Figure 16:
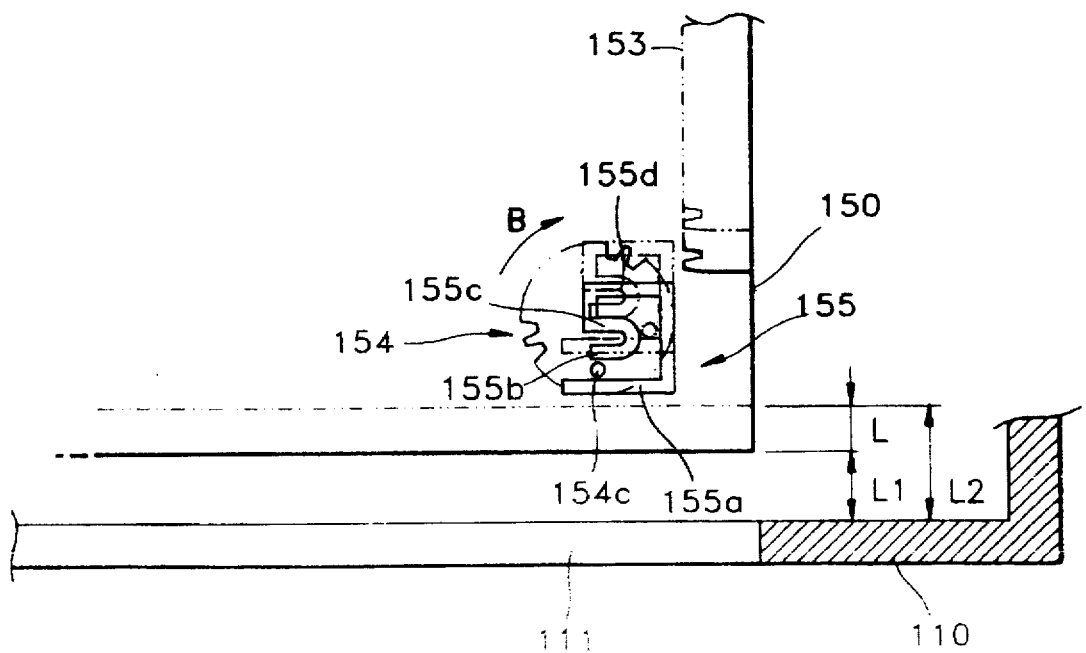

The first tray 150, having received a new disk from the magazine 120 by the rollers 170 at the second position, moves back to the first position by the rotation of the coupling protrusion 154c of the first rotator 154 within the locking rib 155 in the lower portion of the first tray 150. In other words, as depicted by the dashed line of FIG. 15, in the state where the coupling protrusion 154c of the first rotator 154 is inserted between the third wall 155c and fourth wall 155d of the first tray 150 to fix the first tray 150 at the second position, the tray driving motor 180 operates so that the first rotator 154 rotates in the direction of arrow B. Accordingly, the coupling protrusion 154c rotates in the direction of arrow B and then makes contact with the first wall 155a, as depicted by the solid line of FIG. 15. The continued rotation of the first rotator 154 causes the coupling protrusion 154c to press against the first wall 155a and reaches a position between the first wall 155a and second wall 155b, as depicted by the solid line of FIG. 16. In the course of such operation, the first tray 150 is moved toward the disk entrance 111 of the housing 110 a predetermined distance L.

Figure 17:
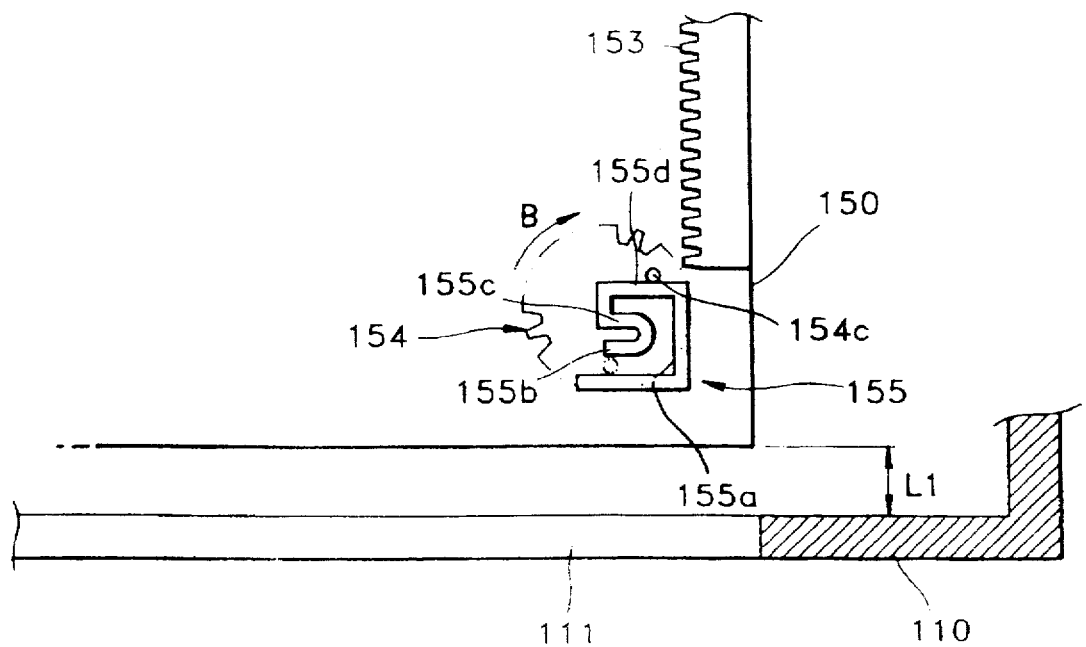
FIGS. 17 through 19 are structural plan views of important portions, sequentially showing the positional relationship between a locking rib of the first tray and a connecting protrusion of the first rotator when the first tray is transferred from the first position to the position where the first tray is projected to the outside of the housing via an opening of the housing.
Figure 18:
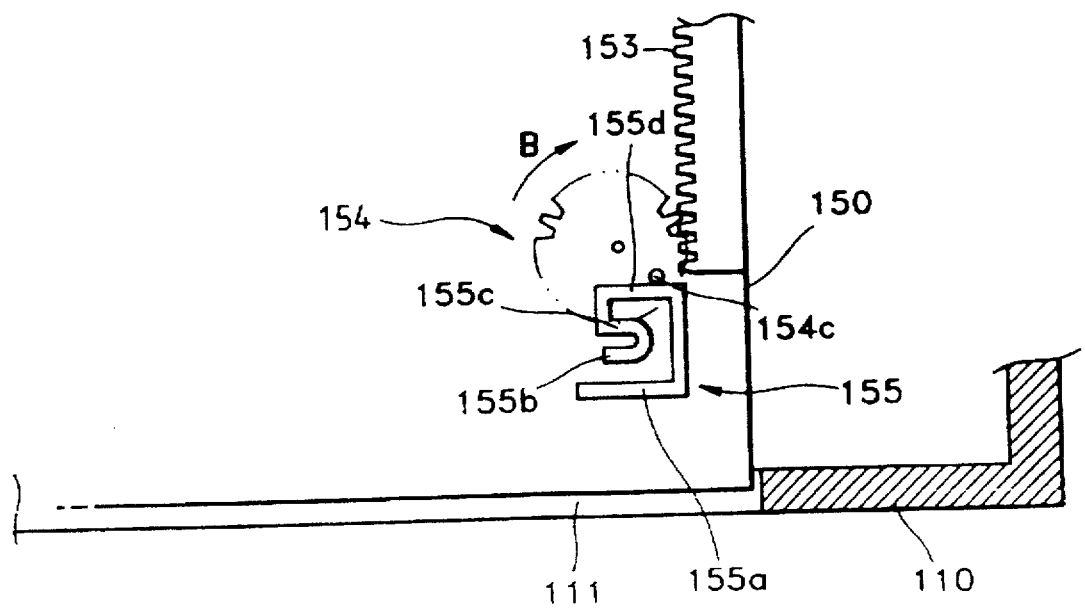
Figure 19:
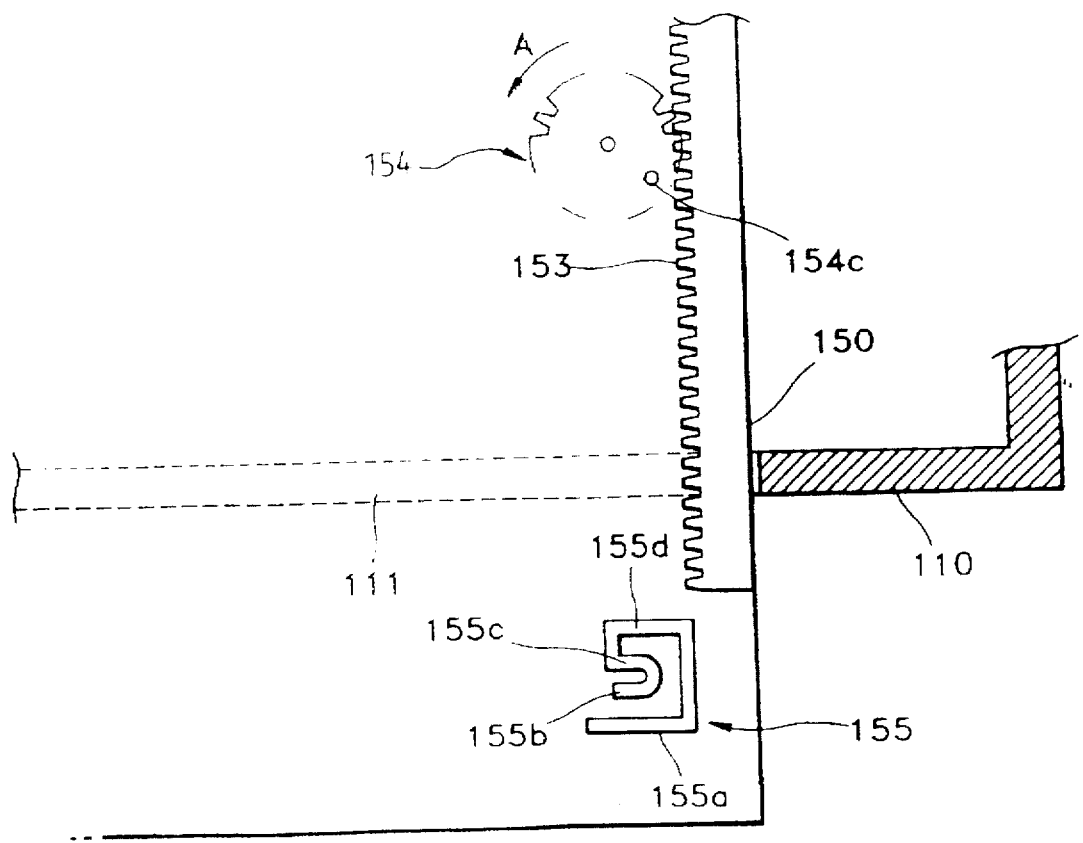

If the rotation of the tray driving motor 180 stops here, the rotation of the first rotator 154 and coupling protrusion 154c thereof also stop. Thus, the first tray 150 can be fixed at the first position by the coupling protrusion 154c inserted between the first wall 155a and second wall 155b. If the driving motor 180 continues to rotate from the position of the coupling protrusion 154c being between the first wall 155a and second wall 155b, the coupling protrusion 154c also continues to rotate in the direction of arrow B to exit the locking rib 155 and makes contact on the outside of the fourth wall 155d of the locking rib 155, as depicted by the solid line of FIG. 17. Then, the coupling protrusion 154c presses against the fourth wall 155d and moves the first tray 150 forward toward the disk entrance 111 of the housing 110, as shown in FIG. 18. In the course of the forward movement of the first tray 150, the gear 154a of the first rotator 154 engages with the rack 153a of the first tray 150 and as the tray driving motor 180 continues to rotate, the first rotator 154 continues to rotate by the friction force between the friction unit 154b and friction member 182. Accordingly, the first tray 150 continues to move toward and eventually out of the housing 110 via the disk entrance 111 by the gear 154a and rack 153a, as shown in FIG. 19.

With the first tray 150 protruding out of the housing 110, the disk seated in disk seating unit 151 can be replaced by a new disk.

Figure 20:
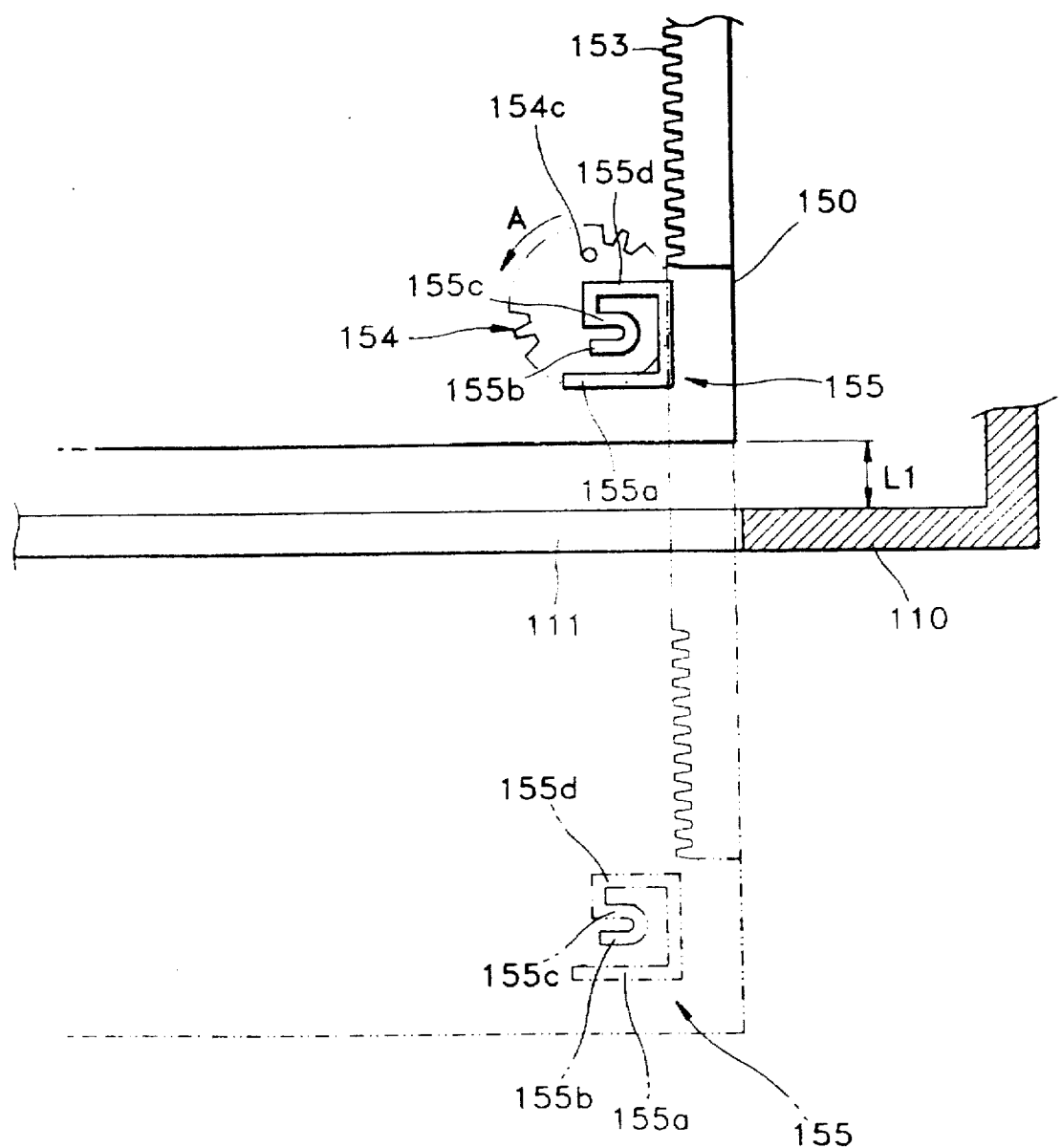
FIG. 20 is a structural plan view of important portions, showing the positional relationship between a locking rib of the first tray and a connecting protrusion of the first rotator when the first tray projected to the outside of the housing is moved back inside of the housing.

Thereafter, if the tray driving motor 180 is rotated in the reverse direction, the first rotator 154 rotates in the direction of arrow A by the friction force between the friction member 182 and the friction unit 154b of the first rotator 154. The first tray 150 having rack 153a engaged with the gear 154a of the first rotator 154 is again moved back inside the housing 110 until the teeth of the gear 154a of the first rotator 154 and the rack 153a of the first tray 150 are no longer engaged, thereby positioning the first tray 150 at the first position, as depicted by the solid line of FIG. 20.

Then, the tray driving motor 180 rotates until the protrusion 154c of the first rotator 154 is inserted between the first wall 155a and second wall 155b of the first tray 150 by being rotated in the direction of arrow A, as shown in FIG. 12. In the course of such operations, since the teeth of the gear 154a of first rotator 154 and rack 153a of first tray 150 are no longer engaged, the first tray 150 remains at the first position. If the rotation of the tray driving motor 180 stops when the protrusion 154c is inserted between the first wall 155a and second wall 155b, the first tray 150 will be fixed at the first 20 position in spite of the external force against the first tray 150, the backward and forward movement of the first tray 150 being prevented by the walls of the locking rib 155.

Through the above-described procedure, a disk replacing operation is allowed such that a disk stored in the magazine can be extracted and replaced by a new disk to be loaded in the disk receiving shelf 121 within the magazine 120.

The raising and lowering operation of the magazine 120 will now be described in this embodiment. First, the tray driving motor 180 is rotated in reverse to elevate the subtray 130. At this time, the rotational force of the tray driving motor 180 is transferred to the rotation cam plate 187 via the driving gear 181 and a train of gears 184, 185 and 186, and the slide member 188 is moved by the upper protrusion 188a inserted into the snail cam groove 187a of the rotation cam plate 187, as depicted by the solid line of FIG. 4. Accordingly, the rotating member 189 moves in the state depicted by the solid line of FIG. 4, as opposed to the operation of elevating the subtray 130, and the coupling gear 191 rotatably connected to the end of the rotation member 189 is meshed with the first connecting gear 124, as depicted by the solid line of FIG. 4.

Then, when the elevating motor 190 installed to the rotation member 189 is rotated to rotate the coupling gear 191, the first connecting gear 124 and gear 123 connected thereto rotate and the screw stock 122 at which the gear 123 is fixed also rotates. The magazine 120 screw-coupled to the screw stock 122 is raised or lowered along the guide stock 122a according to the rotating direction of the screw stock 122, i.e., the rotating direction of elevating the motor 190.

As described above, while the disk D2 seated in the disk seating unit 161 of the second tray 160 is recorded or reproduced, the first tray 150 reciprocally moves between the first position and the second position or between the first position and the ejected position of the first tray 150 according to the rotation of the tray elevating motor 180. Thus, during disk recording or reproduction, the replacement of a disk within the magazine 120 can be performed, that is, a disk accommodated in a predetermined disk receiving shelf among the disk receiving shelves 121 within the magazine 120 can be extracted and replaced by a new disk in the predetermined disk receiving shelf.

If another disk within the magazine 120 is to be reproduced or recorded after the completion of the disk reproduction or recording, the disk D2 seated in the second tray 160 should be replaced with the other disk to be reproduced or recorded. For this purpose, tray driving motor 180 is operated to connect coupling gear 191 the coupled to rotating member 189 with the second connecting gear 192 to then reverse the rotating direction of the elevating motor 190 for elevating the subtray 130. Then, the rack member 195 returns to the back of the housing 110 through the train of the gears 192, 193 and 194 and then the subtray 130 is lifted according to the movement of the rack member 195.

With the subtray 130 lifted, the recorded/reproduced disk D2 on the turntable 141 is seated in the disk seating unit 161 of the second tray 160, as shown in FIGS. 3 and 7, and the second tray 160 of the first position is transferred to the height of the disk entrance 111 of the housing 110. The friction member 182 coupled to the output shaft of the tray driving motor 180 makes contact with the friction unit 164b of the second rotator 164. In such a state, if the tray driving motor 180 is rotated, the second rotator 164 rotates by the friction force between the friction member 182 of the tray driving motor 180 and friction unit 164b of the second rotator 164.

Figure 21:
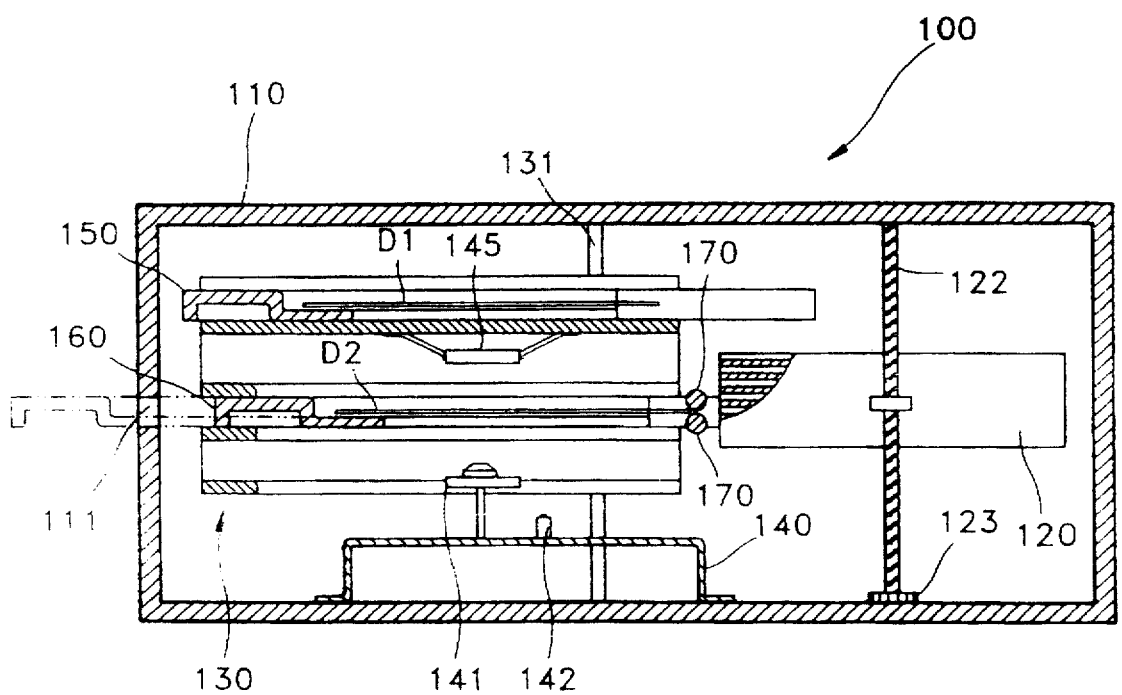
FIG. 21 is a schematic sectional view showing the second tray moved to the second position.

In the raised state of the subtray 130, the second tray 160 is moved to the second position where the disk D2 seated in disk seating unit 161 is inserted between the rollers 170, as depicted by the solid line of FIG. 21. Here, since the second tray 160 has the locking rib 165 having the same configuration as that of the locking rib 155 of the first tray 150 and a coupling protrusion 164c having the same configuration as that of the coupling protrusion 154c of the first rotator 154, as described earlier. Thus, the second tray 160 can be moved to the second position in the same manner as that of the first tray 150.

Since the disk D2 of the second tray 160 which is moved to the second position is inserted between the rollers 170, a new disk accommodated within the magazine 120 can be seated in the disk seating unit 161 of the second tray 160 in the same manner as the disk changing process of the first tray 150, thereby completing the disk changing operation.

After the operation of changing disks of the second tray 160 is completed, second tray 160 returns to the first position. In such a state, if the subtray 130 is lowered, a new disk is supported on the turntable 141 to then be reproduced or recorded.

As described above, the second tray 160 includes the rack 163a having the same configuration as that of the rack 153a of the first tray 150 and the second rotator 164 having the same configuration as that of the first rotator 154. Also, the gear 164a of the second rotator 164 is geared with the rack 163a of the second tray 160. Thus, in the raised state of the subtray 130, the second tray 160 may protrude to the outside of the housing 110 via the disk entrance 111 by the rotation of the tray driving motor 180 and a friction force between the friction unit 164b of the second rotator 164 and the friction member 182, as depicted by the dashed line of FIG. 21.

Therefore, when a disk is not being recorded or reproduced, a disk accommodated in any disk receiving shelf among the disk receiving shelves 121 of the magazine 120 can be replaced with a new one by the second tray 160 which can be inserted into/ejected from the disk entrance 111 of the housing 110 by the tray transferring means in the raised state of the subtray 130.

In the above-described embodiment, one of the first tray 150 and the second tray 160 is selectively moved by one tray driving motor 180 installed in the housing 110. However, for example, a motor for moving the first tray 150 and a motor for moving the second tray 160 may be separately installed on the subtray 130.

In the above-described embodiment, according to the rotating direction of the tray driving motor 180, the coupling gear 191 rotatably coupled to the rotating member 189 is connected with the first connecting gear 124 or the second connecting gear 192, and the elevating motor 190 installed in the rotating member 189 is rotated to selectively elevate the subtray 130 or the magazine 120.

Figure 22:
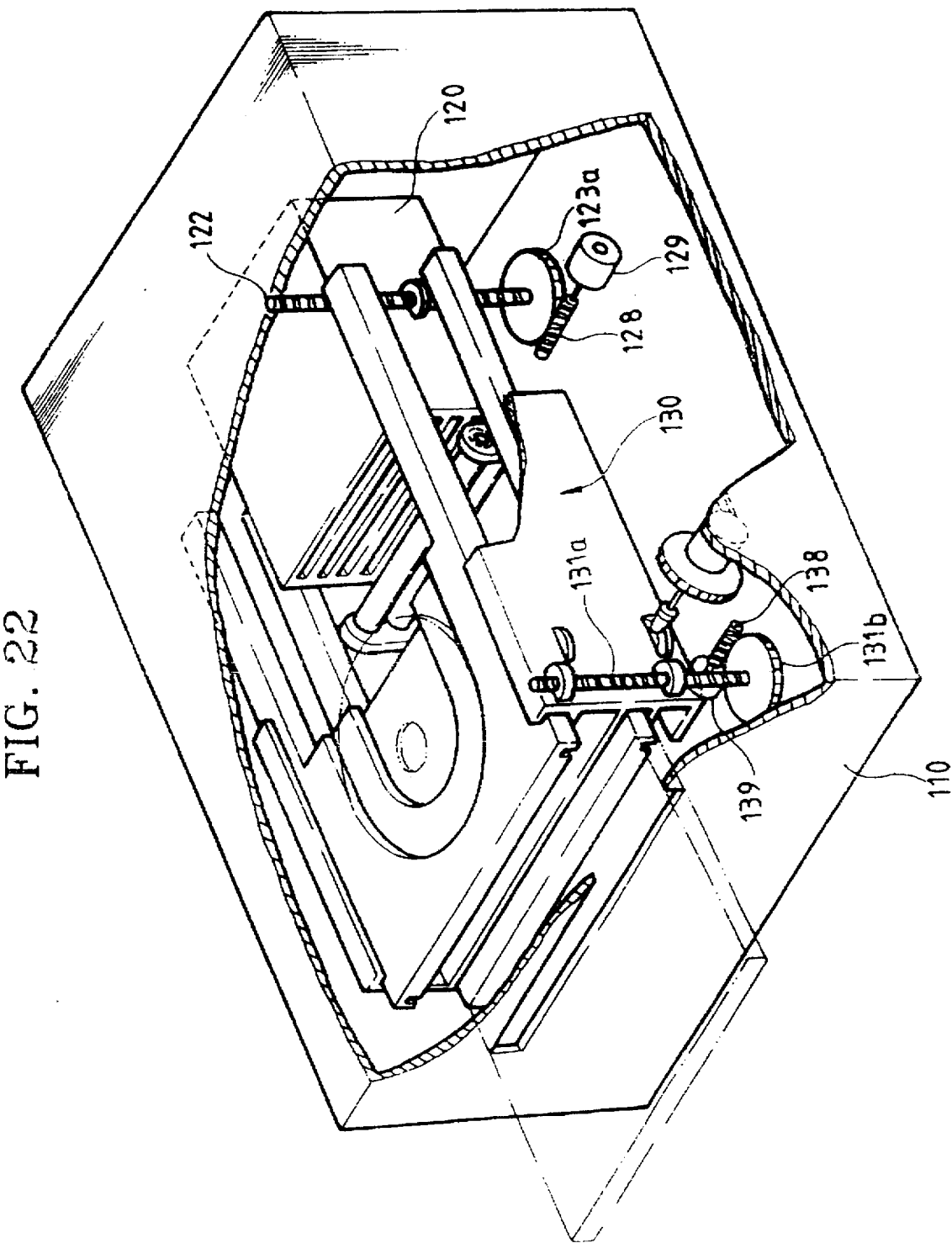
FIG. 22 is a schematic perspective view of another embodiment of the present invention.

However, in another embodiment, the magazine 120 and the subtray 130 may be lifted independently. For instance, means for elevating the subtray 130 and means for elevating the magazine 120 may be constructed separately, as shown in FIG. 22. In other words, the magazine elevating means is comprised of a first worm gear 123a fixed to the screw stock 122 and a first motor 129 fixed on the housing 110 and having a first worm 128 coupled to the first worm gear 123a at its output shaft. The subtray elevating means is comprised of an auxiliary screw stock 131a rotatably coupled to the housing 110 and screw-coupled to the subtray 130, a second worm gear 131b fixed to the auxiliary screw stock 131a and a second motor 139 fixed on the housing 110 and having a second worm 138 coupled to the second worm gear 131b at its output shaft.

In such an embodiment, when the first motor 129 rotates, the rotation force is transmitted to the screw stock 122 via the first worm 128 and the first worm gear 123a coupled thereto to rotate the screw stock 122, thereby lifting or lowering the magazine 120. Also, when the second motor 139 rotates, the rotation force is transmitted to the auxiliary screw stock 131a via the second worm 138 and second worm gear 131b coupled thereto to rotate the auxiliary screw stock 131a, thereby raising or lowering the subtray 130.

In such an embodiment, the subtray 130 and the magazine 120 can be raised or lowered independently.

Figure 2:
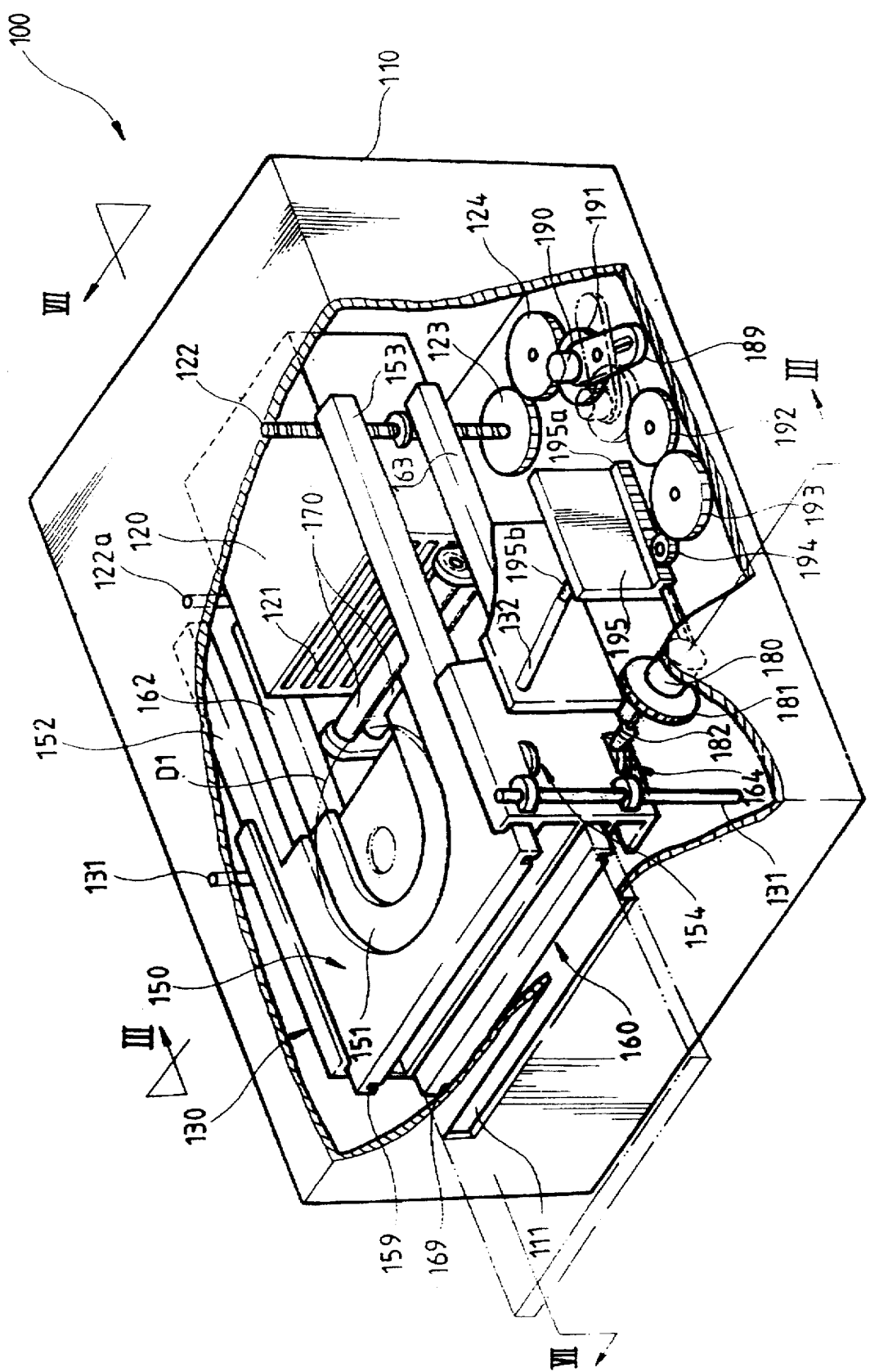
FIG. 2 is a schematic perspective view of a disk recording/reproducing apparatus according to the present invention.

In the disk recording/reproducing apparatus 100 described with reference to FIG. 2, the rack 153a of the first tray 150 extends from the end of the guide 153 adjacent to the portion where the locking rib 155 is formed. When the first rotator 154 rotates, the first tray 150 is inserted into or extracted from the disk entrance 111 of the housing 110 and is movable to the second position by the engagement of the rack 153a with the gear 154a and the engagement of the locking rib 155 with the coupling protrusion 154c. However, the rack 153a beneath first tray 150 may be further extended to the front of the first tray 150 with only the gear 154a of the first rotator 154 engaged to the rack 153a of the first tray 150 without the engagement of the locking rib 155 with the coupling protrusion 154c, to then be moved to the second position and the position where the first tray 150 protrudes out the disk entrance 111.

Also, the second tray 160 may be moved to the second position and the position where the second tray 160 protrudes out of the disk entrance 111 only with the engagement of the gear 164a of the second rotator 164 with the rack 163a of the second tray 160 by further extending the rack 163a beneath the second tray 160 to the front of the second tray 160, without the engagement of the coupling protrusion 164c of the second rotator 164 and locking rib 165 beneath the second tray 160.

In the embodiments having been described above, the first tray 150 and second tray 160 are movably installed between the first position and the second position, for inserting disks seated on each disk seating unit between the rollers 170. However, as in conventional apparatuses, with the first and second trays fixed at the first position, a separate extracting lever may be installed between the first and second trays to insert a disk between the rollers.

Although specific embodiments of the present invention have been shown and described, it will be understood that various modifications may be made without departing from the spirit and scope of the present invention.

As described above, in the disk recording/reproducing apparatus according to the present invention, disks mounted in a magazine can be replaced even while a disk is being reproduced or recorded.

What is claimed is:

1. A disk recording/reproducing apparatus comprising:
   a housing including a front wall having at least one disk entrance therein, said disk entrance being positioned at a preset height;
   a magazine having a plurality of disk receiving shelves and elevatably installed at a rear of said housing;
   means for elevating said magazine;
   a deck installed on said housing between said disk entrance and said magazine;
   a subtray elevatably installed in said housing above said deck;
   means for elevating said subtray;
   a first tray having a first disk seating unit thereon and slidably supported by said subtray so as to be movable back and forth with respect to said housing, said first tray being positioned at the same height as said disk entrance in a lowered state of said subtray;
   a second tray having a second disk seating unit thereon and slidably supported by said subtray below said first tray to be movable back and forth with respect to said housing, said second tray being positioned at the same height as said disk entrance in a raised state of said subtray;
   means for transferring a disk mounted within said magazine to the disk seating unit of one of said first and second trays positioned at the same height as said disk entrance to seat said disk on said disk seating unit of said first or second tray or to accommodate said disk seated thereon into said magazine;
   a turntable installed on said deck and operative to protrude beyond said second disk seating unit, so as to pick up a selected disk placed on said second disk seating unit and place the selected disk thereon during lowering of said subtray;
   an optical pickup installed on said deck; and
   a tray transferring means for horizontally moving one of said first and second trays positioned at the same height as said disk entrance back and forth with respect to said housing to insert and extract said tray through said disk entrance.

2. The disk recording/reproducing apparatus as claimed in claim 1, wherein said first tray and said second tray include racks respectively installed in a front to rear direction with respect to said housing, and wherein said tray transferring means includes:
   a first rotator rotatably mounted on said subtray and having a gear engaged with said rack of said first tray at one end and a friction unit at an opposite end,
   a second rotator rotatably mounted on said subtray below said first rotator and having a gear engaged with said rack of said second tray at one end and a friction unit facing and spaced apart from the friction unit of said first rotator at an opposite end,
   a motor having an output shaft and being fixedly installed with respect to said housing, and
   a friction member fixed on the output shaft of said motor, said friction member being operative to contact the friction unit of said first rotator in the lowered state of said subtray and to contact the friction unit of said second rotator in the raised state of said subtray.

3. The disk recording/reproducing apparatus as claimed in claim 2, wherein said friction member is formed by rubber.

4. The disk recording/reproducing apparatus as claimed in claim 2, wherein said friction member is conical in shape and each of said friction units is complementary in shape.

* * * * *